United States Patent [19]
Park et al.

[11] Patent Number: 5,323,458
[45] Date of Patent: Jun. 21, 1994

[54] ECHO CANCELLATION IN A FULL-DUPLEX SPEAKERPHONE

[75] Inventors: Sangil Park; Garth D. Hillman, both of Austin, Tex.

[73] Assignee: Motorola Inc., Schaumburg, Ill.

[21] Appl. No.: 140,927

[22] Filed: Oct. 25, 1993

[51] Int. Cl.⁵ .......................................... H04M 9/00
[52] U.S. Cl. ............................. 379/390; 379/389; 379/391; 379/410; 379/409; 379/388
[58] Field of Search ............... 379/390, 389, 391, 410, 379/409; 381/83

[56] References Cited

U.S. PATENT DOCUMENTS

| | | | |
|---|---|---|---|
| 4,564,939 | 1/1986 | Hansen | 370/85 |
| 4,636,586 | 1/1987 | Schiff | 379/390 |
| 4,956,838 | 9/1990 | Gilloire et al. | 379/410 |
| 4,965,822 | 10/1990 | Williams | 379/390 |
| 5,027,393 | 6/1991 | Yamamura et al. | 379/410 |
| 5,062,102 | 10/1991 | Taguchi | 370/32.1 |
| 5,121,426 | 6/1992 | Baumhauer, Jr. et al. | 379/390 |
| 5,187,741 | 2/1993 | Erving et al. | 379/389 |

*Primary Examiner*—James L. Dwyer
*Assistant Examiner*—Jacques M. Saint-Surin
*Attorney, Agent, or Firm*—Daniel D. Hill

[57] ABSTRACT

A direct-path echo cancellation circuit includes a loudspeaker (12), first and second microphones (14, 16), and an in-phase signal cancellation circuit (21, 43). The first and second microphones (14, 16) are positioned adjacent the loudspeaker (12) in order to receive in-phase direct-path echo components (31, 32) of an output signal from the loudspeaker (12). The in-phase signal cancellation circuit (21 or 43) combines the in-phase direct-path echo components of the output signal in order to cancel the direct-path echo components. Direct-path echo cancellation helps to reduce howling and/or oscillation in a full-duplex speakerphone system. Also, direct-path echo cancellation provides more dynamic range to an input signal which is provided to a speakerphone signal processing system (26).

14 Claims, 4 Drawing Sheets

ECHO CANCELLATION IN A FULL-DUPLEX SPEAKERPHONE

FIELD OF THE INVENTION

This invention relates generally to telecommunications systems, and more particularly, to echo cancellation in a full-duplex speakerphone.

BACKGROUND OF THE INVENTION

Full-duplex speakerphones using present signal processing technology have problems with acoustic echo cancellation. Since full-duplex speakerphones should be able to operate in a variety of environments, they are designed to accommodate environments having high levels of acoustic echo. The acoustic echo may be a direct-path echo from the loudspeaker to the microphone, or may be a reflected echo, where the delay of the reflected echo may be several hundred milliseconds, depending on the size of the room, location of objects, etc. The direct-path echo typically has a larger signal strength than a reflected echo. Thus, the result of direct-path echo may be a large reduction in dynamic range, as well as an annoying howling from the loudspeaker.

Full-duplex speakerphones typically implement adaptive echo cancellation which uses very large AFIR (adaptive finite impulse response) filters for canceling acoustic echo. Adaptive echo cancellers are usually very effective at reducing reflected, or delayed, acoustic echo because the echo signal strength is smaller, and has been changed from the original audio signal. However, when there is a direct-path echo and several reflected echoes, the direct-path echo has a larger signal strength than the signal strength of any of the reflected echoes. The adaptive echo canceller attempts to cancel the strongest signal among the echoed signals. Therefore, the adaptive echo canceller may tend to ignore the weaker reflected echoes when strong direct-path echoes are present.

The typical solution to direct-path echo reduction is to isolate the microphone from the loudspeaker by as much effective distance as possible. In expensive teleconferencing equipment, the loudspeaker may be mounted on a wall or a ceiling, for example, and the microphone may by placed on a table which is a sufficient distance from the loudspeaker to reduce the effects of direct-path echo. In other speakerphone systems where the microphone and the loudspeaker are in the same housing, or enclosure, sound damping materials may be used to attempt to isolate the microphone from the loudspeaker.

SUMMARY OF THE INVENTION

Accordingly, there is provided, in one form, in a full-duplex speakerphone system, an apparatus for direct-path echo cancellation. The apparatus includes a loudspeaker, first and second microphones, and in-phase signal cancellation circuit. The loudspeaker is for providing an output signal. The first and second microphones are located adjacent to the loudspeaker. The second microphone is positioned on a side of the loudspeaker opposite the first microphone, so that the first and second microphones receive in-phase direct-path echo components of the output signal. The in-phase signal cancellation circuit has input terminals coupled to the first and second microphones. The in-phase signal cancellation circuit combines, with opposite polarity, the in-phase direct path echo components of the output signal in order to cancel the in-phase direct-path echo components. These and other features and advantages will be more clearly understood from the following detailed description taken in conjunction with the accompanying drawings.

DESCRIPTION OF A PREFERRED EMBODIMENT

Generally, the present invention provides for echo cancellation in a full-duplex speakerphone. Two adaptive echo cancellers are commonly used to allow a full-duplex conversation, one adaptive echo canceller is used to cancel an electric echo which is created at a transmission line coupler (TLC) used for a 2-wire/4-wire signal conversion and the other adaptive echo canceller is used to cancel the reflected acoustic echo. Since the reflected acoustic echoes are created inside a changing environment, the adaptive echo canceller has to continually adapt to changing echo characteristics. However, current adaptive echo cancellers do not utilize the maximum dynamic range that an input signal can provide because of the direct-path echo component. This may result in poor echo canceling performance, or in some cases, may create an oscillation state (known as howling). The present invention maximizes dynamic range of the adaptive echo cancellers by removing the direct-path echo component, while passing a near-end speech signal. This allows the adaptive echo cancellers to utilize the maximum dynamic rang and perform echo cancellation on the reflected echoes more effectively.

Figure 1:
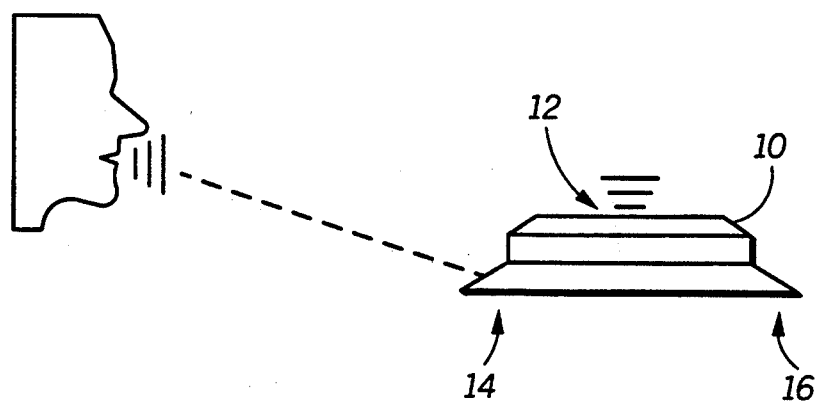
FIG. 1 illustrates a side view of a speakerphone enclosure in accordance with the present invention.
Figure 2:
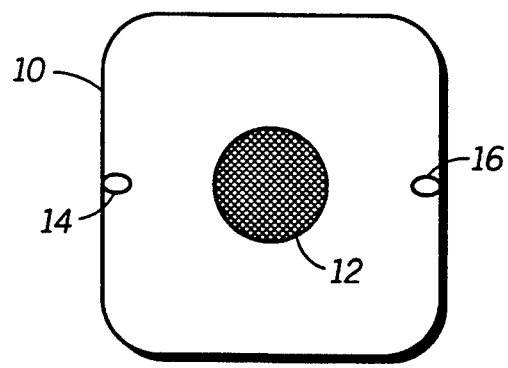
FIG. 2 illustrates a top view of the speakerphone enclosure of FIG. 1.

The present invention can be more fully described with reference to FIG. 1-7. FIG. 1-7 incorporate many of the same or similar elements. Therefore, like reference numerals designate identical or substantially corresponding elements throughout FIG. 1-7. FIG. 1 illustrates a side view of speakerphone housing 10 in accordance with the present invention. FIG. 2 illustrates a top view of speakerphone enclosure 10 of FIG. 1. Referring to FIG. 1 and to FIG. 2, speakerphone housing 10 includes loudspeaker 12 and microphones 14 and 16. Loudspeaker 12 faces upward with microphones 14 and 16 positioned on either side of loudspeaker 12. Microphones 14 and 16 are each positioned the same distance, and on opposite sides of loudspeaker 12. Microphones 14 and 16 are directional microphones that face outward from loudspeaker 12 at an angle approximately equal to 70 degrees to the vertical. In use, speakerphone housing 10 is oriented so that either of microphones 14 and 16 face generally toward the person that is speaking. Since microphones 14 and 16 are the same distance from loudspeaker 12, the direct-path echoes received by microphones 14 and 16 are in-phase echoes.

Figure 3:
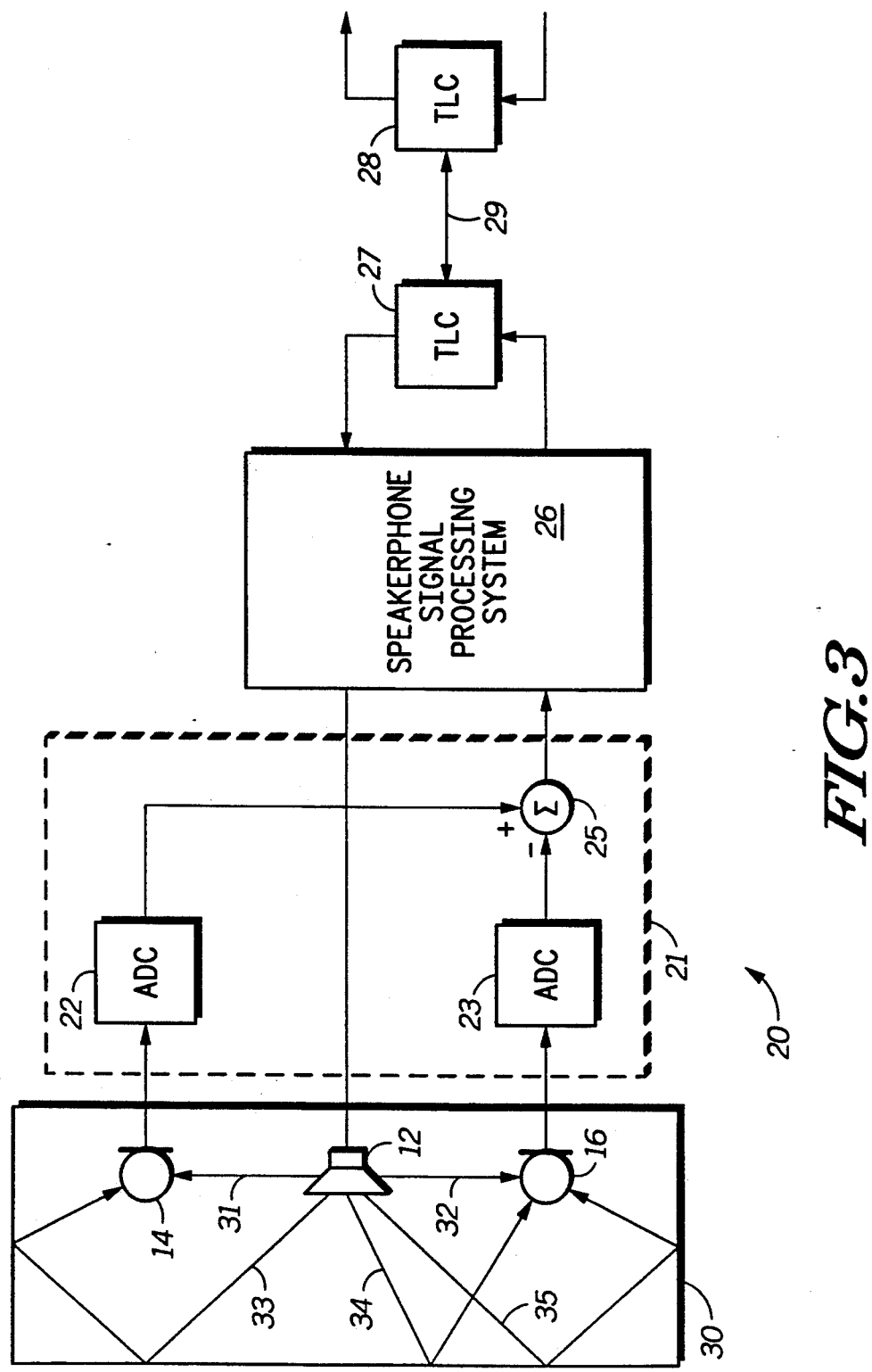
FIG. 3 illustrates in block diagram form a speakerphone in accordance with one embodiment of the present invention.

FIG. 3 illustrates in block diagram form, speakerphone 20 in accordance with one embodiment of the present invention. Full-duplex speakerphone 20 includes microphones 14 and 16, loudspeaker 12, in-phase signal cancellation circuit 21, speakerphone signal processing system 26, and transmission line coupler 27. Microphones 14 and 16 and loudspeaker 12 are physically located within room 30. In room 30, various sources of echo are illustrated. Echo paths 33, 34, and 35 illustrate delayed, or reflected echo paths from objects or walls of room 30 from loudspeaker 12 to microphones 14 and 16. Echo paths 31 and 32 illustrate direct-path echoes from loudspeaker 12 to microphones 14 and 16. In a typical full-duplex speakerphone using one microphone and one loudspeaker, adaptive echo cancellation (not shown) in processing system 26 is less effective at reducing the effects of reflected echoes due to the strength dominance of the direct-path echo as explained above.

In-phase signal cancellation circuit 21 combines the in-phase direct path echo components in a digital-domain. In-phase cancellation circuit 21 includes analog-to-digital converters 22 and 23, and summation circuit 25. Analog-to-digital converter 22 has an input terminal connected to an output terminal of microphone 14, and an output terminal. Analog-to-digital converter 23 has an input terminal connected to an output terminal of microphone 16, and an output terminal. Summation circuit 25 has a positive input terminal connected to the output terminal of analog-to-digital converter 22, a negative input terminal connected to the output terminal of analog-to-digital converter 23, and an output terminal. Speakerphone signal processing system 26 has an input terminal connected to the output terminal of summation circuit 25, and an output terminal connected to an input terminal of loudspeaker 12. Two-wire transmission line 29 couples speakerphone 20 to transmission line coupler 28 of another speakerphone system (not shown).

Speakerphone signal processing system 26 is a conventional digital signal processing system and includes two adaptive filters (not shown); one is for canceling electrical echoes due to the 2-wire/4-wire hybrid depicted as transmission line coupler 27; the other is for canceling acoustic echoes received through summation circuit 25. The sound from loudspeaker 12, which is the received far-end speech signal from transmission line 29, is reflected via walls of room 30 before it reaches microphones 14 and 16. The largest acoustic echo signal is from direct-paths 31 and 32. However, the microphone signals are in-phase with respect to the signal phase of loudspeaker 12. After analog-to-digital converters 22 and 23 digitize the microphone signals, the microphone signals are digitally subtracted to remove the in-phase echo component with summation circuit 25. In return, the output of summation circuit 25 has only reflected/reverberated echo components which are much lower in magnitude as compared to the direct-path echo component. Deleting the direct-path echo component by utilizing in-phase signal cancellation can eliminate the howling/oscillation problem. In addition, an adaptive echo canceller in speakerphone signal processing system 26 can optimize the dynamic range of an arithmetic logic unit such as the number of bits representing adaptive coefficients and multiplier resolution.

Figure 4:
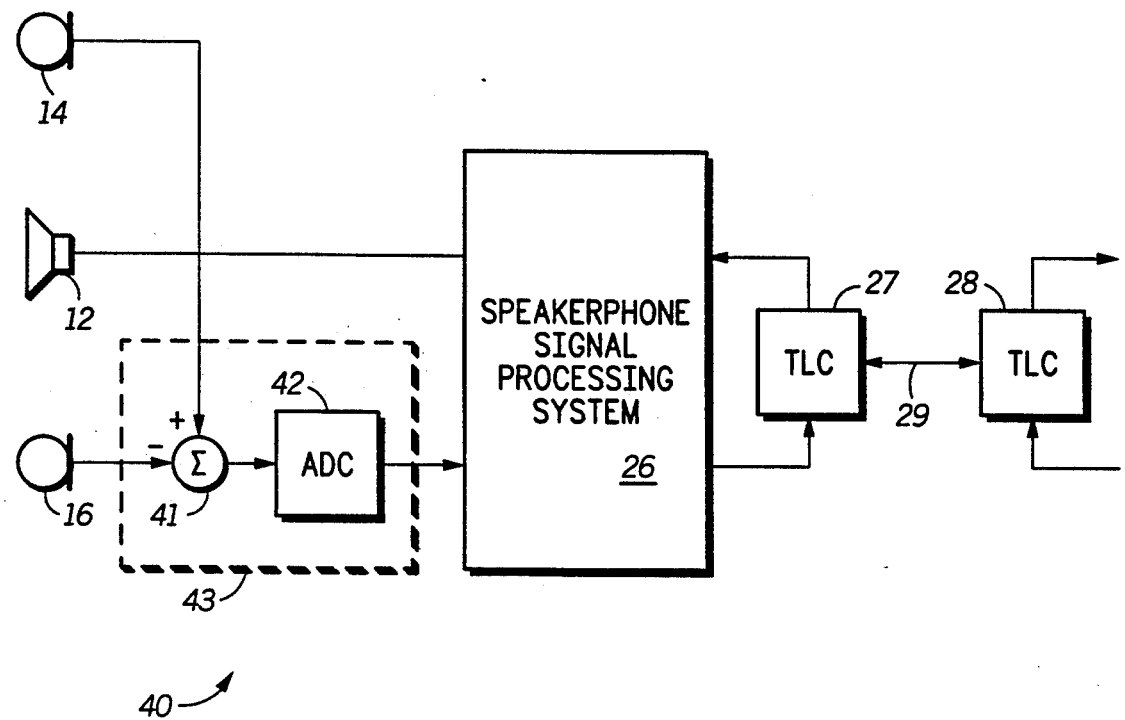
FIG. 4 illustrates in block diagram form a speakerphone in accordance with another embodiment of the present invention.
Figure 5:
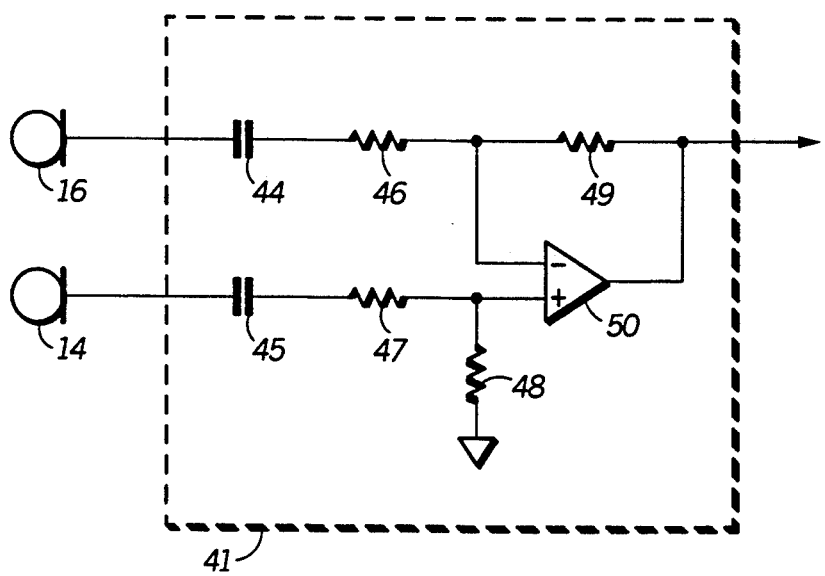
FIG. 5 illustrates in schematic diagram form the summation circuit of FIG. 4.

FIG. 4 illustrates in block diagram form, speakerphone 40 in accordance with another embodiment of the present invention. Speakerphone 40 includes microphones 14 and 16, loudspeaker 12, in-phase cancellation circuit 43, speakerphone signal processing system 26, and transmission line coupler 27. In-phase cancellation circuit 43 includes summation circuit 41 and analog-to-digital converter 42. Summation circuit 41 has a positive input terminal connected to an output terminal of microphone 14, a negative input terminal connected to an output terminal of microphone 16, and an output terminal. Analog-to-digital converter 42 has an input terminal connected to the output terminal of summation circuit 41, and an output terminal. Summation circuit 41 is illustrated in FIG. 5 and will be discussed later. Speakerphone signal processing system 26 has an input terminal connected to the output terminal of analog-to-digital converter 42, an output terminal connected to an input terminal of loudspeaker 12. Two-wire transmission line 29 couples speakerphone 20 to transmission line coupler 28 of another speakerphone.

In-phase signal cancellation circuit 43 combines the in-phase direct path echo components in an analog-domain to remove the direct-path echo components from the input signal. The analog input signals of the microphones 14 and 16 are provided to analog summation circuitry 41 which is implemented by a differential amplifier circuit, illustrated in FIG. 5, to obtain a proper analog voltage before being provided to analog-to-digital converter 42. As illustrated in FIG. 4, the output of analog-to-digital converter 42 is provided to an adaptive echo canceller in speakerphone signal processing system 26 for removing the reflected echo components.

FIG. 5 illustrates in schematic diagram form, summation circuit 41 of FIG. 4. Summation circuit 41 includes capacitors 44 and 45, resistors 46, 47, 48, and 49, and operational amplifier 50. Capacitor 44 has a first plate electrode connected to the output terminal of microphone 16, and a second plate electrode. Resistor 46 has a first terminal connected to the second plate electrode of capacitor 44, and a second terminal. Capacitor 45 has a first plate electrode connected to the output terminal of microphone 14, and a second plate electrode. Resistor 47 has a first terminal connected to the second plate electrode of capacitor 45, and a second terminal. Resistor 48 has a first terminal connected to the second terminal of resistor 47, and a second terminal connected to a power supply voltage terminal labeled "$V_{SS}$". Operational amplifier 50 has a noninverting input terminal connected to the second terminal of resistor 47, an inverting input terminal connected to the second terminal of resistor 46, and an output terminal connected to the input terminal of analog-to-digital converter 42 (FIG. 4). Resistor 49 has a first terminal connected to the inverting input terminal of operational amplifier 50, and a second terminal connected to the output terminal of operational amplifier 50. In a preferred embodiment, $V_{SS}$ is connected to zero volts, or ground potential.

Since summation circuit 41 uses a differential input stage, the difference between two microphone input signals will be amplified by operational amplifier 50, regardless of the values of the resisters. The required voltage gain for a particular application can be selected by setting proper values for resisters 46, 47, 48, and 49. The voltage gain of summation circuit 41 is approximately equal to $R_2/R_1$, where $R_1$ is the resistance of each of resistors 48 and 49, and $R_2$ is the resistance of each of resistors 48 and 49. Capacitors 44 and 45 function as coupling capacitors for preventing an offset voltage from occurring in operation amplifier 50.

Figure 6:
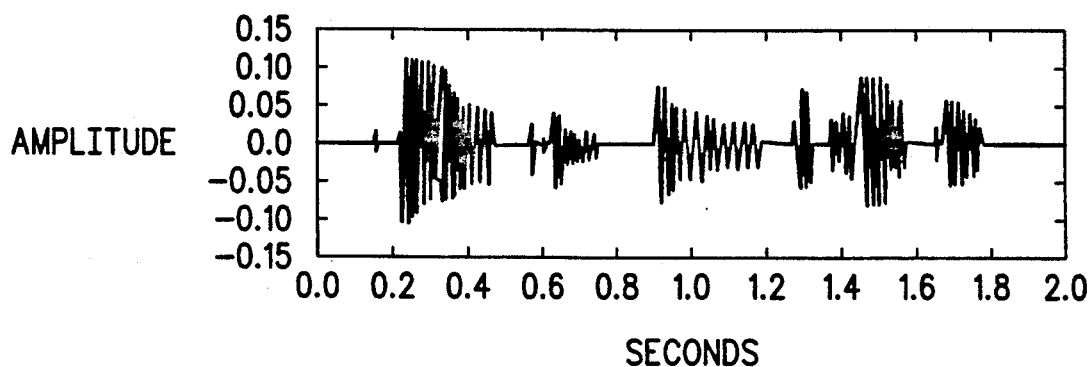
FIG. 6 illustrates a waveform of an input signal including direct path signal component from a loudspeaker.

FIG. 6 illustrates a waveform of an input signal including a direct path signal component from a loudspeaker. The input signal is a speech signal sampled from a normal telephone conversation. The sampling frequency of the input signal was 8 kHz, which is a common sampling frequency in a telephone network.

Figure 7:
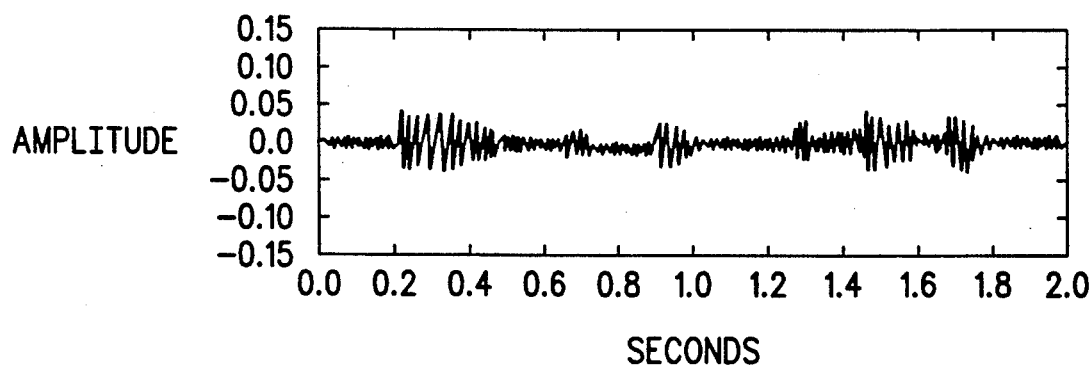
FIG. 7 illustrates a waveform of the input signal of FIG. 6 after in-phase echo cancellation.

FIG. 7 illustrates a waveform of the input signal of FIG. 5 after in-phase signal cancellation of the direct-path signal component shown in FIG. 6. Note that the input signal of FIG. 7 includes an increased level of ambient additive noise from microphones 14 and 16.

The present invention attenuates, or cancels, the direct-path echo component from loudspeaker 12 to microphones 14 and 16 and thereby eliminates howling and/or oscillation from a full-duplex speakerphone system. Also, the present invention provides more dynamic range to an adaptive echo canceller in speakerphone signal processing system 26 (FIG. 4), to cancel reflected/reverberated echo signal to maximize overall echo cancellation performance.

While the invention has been described in the context of a preferred embodiment, it will be apparent to those skilled in the art that the present invention may be modified in numerous ways and may assume many embodiments other than that specifically set out and described above. For example, more than one loudspeaker can be used to have better sound quality for a teleconferencing system and/or more than two microphones can be utilized to have better received signal characteristics and microphone directionality. Accordingly, it is intended by the appended claims to cover all modifications of the invention which fall within the true spirit and scope of the invention.

What is claimed is:

1. In a full-duplex speakerphone system, an apparatus for direct-path echo cancellation, comprising:

a loudspeaker for providing an output signal;

first and second microphones located adjacent to the loudspeaker, the second microphone positioned on a side of the loudspeaker opposite the first microphone, the first and second microphones positioned for receiving in-phase direct path echo components of the output signal; and an in-phase signal cancellation circuit having input terminals coupled to the first and second microphones, for combining with opposite polarity the in-phase direct-path echo components of the output signal in order to cancel the in-phase direct-path echo components.

2. The apparatus of claim 1, wherein the in-phase signal cancellation circuit combines the in-phase direct path echo components in an analog-domain.

3. The apparatus of claim 1, wherein the in-phase signal cancellation circuit comprises:

a summation circuit having a first input terminal coupled to the first microphone, a second input terminal coupled to the second microphone, and an output terminal; and an analog-to-digital converter having an input terminal coupled to the output terminal of the summation circuit, and an output terminal.

4. The apparatus of claim 3, wherein the summation circuit comprises:

a first resistive element having a first terminal coupled to the first input terminal, and a second terminal;

a second resistive element having a first terminal coupled to the second input terminal, and a second terminal;

an operational amplifier having an inverting input terminal coupled to the second terminal of the first resistive element, a noninverting input terminal coupled to the second terminal of the second resistive element, and an output terminal;

a third resistive element having a first terminal coupled to the noninverting input terminal of the operational amplifier, and a second terminal coupled to a power supply voltage terminal; and a fourth resistive element having a first terminal coupled to the inverting input terminal of the operational amplifier, and a second terminal coupled to the output terminal of the operational amplifier.

5. The apparatus of claim 4, wherein the power supply voltage terminal is for receiving a ground potential.

6. The apparatus of claim 4, further comprising:

a first capacitive element coupled between the first input terminal and the first resistive element; and a second capacitive element coupled between the second input terminal and the second resistive element.

7. The apparatus of claim 4, wherein a resistance value of the first resistive element is substantially equal to a resistance value of the second resistive element, and a resistance value of the third resistive element is substantially equal to a resistance value of the fourth resistive element.

8. The apparatus of claim 1, wherein the in-phase signal cancellation circuit combines the in-phase direct path echo components in a digital-domain.

9. The apparatus of claim 1, wherein the in-phase signal cancellation circuit comprises:

a first analog-to-digital converter having an input terminal coupled to the first microphone, and an output terminal;

a second analog-to-digital converter having an input terminal coupled to the second microphone, and an output terminal; and a summation circuit having a first input terminal coupled to the output terminal of the first analog-to-digital converter, and a second input terminal coupled to the output terminal of the second analog-to-digital converter, and an output terminal.

10. An apparatus for direct-path echo cancellation in a full-duplex speakerphone, comprising:

a loudspeaker for providing an output signal;

a first microphone positioned adjacent to the loudspeaker and having an output terminal, the microphone for receiving a first input signal;

a first analog-to-digital converter having an input terminal coupled to the output terminal of the first microphone, and an output terminal;

a second microphone positioned adjacent to the loudspeaker, on a side opposite the first microphone and having an output terminal, the second microphone for receiving a second input signal;

a second analog-to-digital converter having an input terminal coupled to the output terminal of the second microphone, and an output terminal; and a summation circuit having a first input terminal coupled to the output terminal of the first analog-to-digital converter, and a second input terminal coupled to the output terminal of the second analog-to-digital converter, the summation circuit for combining in-phase direct path echo components of the first and second input signals in order to cancel the in-phase direct path echo components.

11. A circuit for direct-path echo cancellation in a full-duplex speakerphone, comprising:

a loudspeaker for providing an output signal;

a first microphone positioned adjacent to the loudspeaker and having an output terminal, the first microphone for receiving a first input signal;

a second microphone positioned adjacent to the loudspeaker, on a side opposite the first microphone and having an output terminal, the second microphone for receiving a second input signal;

a summation circuit having a first input terminal coupled to the output terminal of the first microphone, and a second input terminal coupled to the output terminal of the second microphone, the summation circuit for combining in-phase direct-path echo components of the first and second input signals in order to cancel the in-phase direct path echo components, the summation circuit providing an intermediate signal at an output terminal; and an analog-to-digital converter having an input terminal coupled to the output terminal of the summation circuit for receiving the intermediate signal, and an output terminal coupled to a digital signal processing system.

12. The circuit of claim 11, wherein the summation circuit comprises:

a first resistor having a first terminal coupled to the first input terminal, and a second terminal;

a second resistor having a first terminal coupled to the second input terminal, and a second terminal;

an operational amplifier having an inverting input terminal coupled to the second terminal of the first resistor, a noninverting input terminal coupled to the second terminal of the second resistor, and an output terminal;

a third resistor having a first terminal coupled to the noninverting input terminal of the operational amplifier, and a second terminal coupled to a power supply voltage terminal; and a fourth resistor having a first terminal coupled to the inverting input terminal of the operational amplifier, and a second terminal coupled to the output terminal of the operational amplifier.

13. The circuit of claim 12, further comprising:

a first capacitor coupled between the first input terminal and the first resistor; and a second capacitor coupled between the second input terminal and the second resistor.

14. The circuit of claim 12, wherein the power supply voltage terminal is for receiving a ground potential.

* * * * *